United States Patent Office 3,600,288
Patented Aug. 17, 1971

3,600,288
CURABLE SILICONE-POLYCARBONATE COPOLYMER COMPOSITION
Richard V. Viventi, Schenectady, N.Y., assignor to General Electric Company
No Drawing. Filed Jan. 3, 1969, Ser. No. 788,961
Int. Cl. B01j 1/10; C08g 47/10
U.S. Cl. 204—159.13
4 Claims

ABSTRACT OF THE DISCLOSURE

Organopolysiloxane-polycarbonate copolymers having allylcarbonate chain terminals are cured at room temperature employing organosilicon materials having a plurality of mercaptoalkyl substituents.

BACKGROUND OF THE INVENTION

Organopolysiloxane - polycarbonate copolymers are known to the art and have been described, for example, in U.S. Pat. No. 3,189,662—Vaughn, Jr. As disclosed, these copolymers have a variety of useful properties. While some are employed as thermoplastic polymers, others are cured employing heat and peroxygenated catalysts.

Room temperature curing systems for these materials utilizable in, essentially, the same manner as the room temperature vulcanizing organopolysiloxane compositions, would be an extremely advantageous advance in the art.

SUMMARY OF THE INVENTION

In accordance with the present invention, it has been determined that organopolysiloxane-polycarbonate copolymers including those described in the aforementioned Vaughn patent, can be cured at room temperature, in the presence of an organo-silicon compound having a plurality of mercaptoalkyl substituents, with radiation. Exemplary of the organopolysiloxane-polycarbonate copolymers which can be cured are those having the formula:

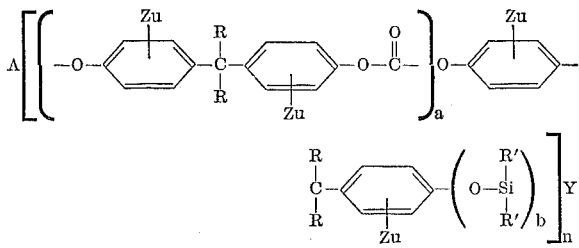

where the chain terminals A and Y of the copolymer are allylcarbonate groups of formula, respectively,

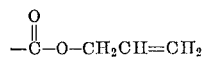

and

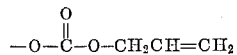

In the above formulas, $n$ is at least 1, and preferably $n$ is an integer equal to from 1 to about 1,000, inclusive, $a$ is equal to from 1 to about 200, inclusive, $b$ is equal to from about 5 to about 200, inclusive, and preferably $b$ has an average value from about 15 to about 90, inclusive, while the ratio of $a$ to $b$ can vary from about .05 to about 3, inclusive, and when $b$ has an average value of from about 15 to about 90, inclusive, the ratio of $a$ to $b$ is preferably from about .067 to about 0.45, inclusive, $u$ is an integer equal to from 1 to 4, R is a member selected from the class of hydrogen, monovalent hydrocarbon radicals and halogenated monovalent hydrocarbon radicals of not more than 18 carbon atoms, R' is a member selected from the class of monovalent hydrocarbon radicals, halogenated monovalent hydrocarbon radicals and cyanoalkyl radicals of not more than 18 carbon atoms, and Z is a member selected from the class of hydrogen, lower ($C_1$–$C_6$) alkyl radicals and halogen radicals.

The organosilicon compounds with the mercaptoalkyl substituents which can be employed, according to the present invention, have the generic formula:

(1) 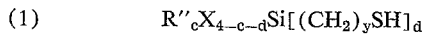

where R" is a monovalent hydrocarbon group of not more than 18 carbon atoms; X is selected from the class consisting of R" and $O_{0.5}$, $c$ is from 1 to 2, $d$ is from 0.02 to 2, and $y$ is from 1 to 25, and the compound has at least two groups of formula —$(CH_2)_y$SH. Thus, the material employed can be an organopolysiloxane fluid having mercaptoalkyl substituents, or a monomeric organopolysiloxane having at least two mercaptoalkyl substituents.

The cross linking reaction of the organopolysiloxane-polycarbonate copolymer is carried out in the presence of radiation in the range of from 100 to 20,000 angstrom units. Thus, the radiation runs from below ultra-violet, through and above infra-red, and thus covers the entire visible range of light. Such radiation can be provided by a commercial sun lamp, or by sunlight itself.

It is thus an object of this invention to provide a method for the room temperature curing of an allylcarbonate terminated organopolysiloxane-polycarbonate copolymer.

It is a further object of this invention to provide a new organopolysiloxane - polycarbonate copolymer cured through a mechanism which includes allylcarbonate terminal groups on the polymer chain and an organosilicon compound having a plurality of alkyl mercaptan substituents.

DESCRIPTION OF THE PREFERRED EMBODIMENTS

The method for forming the allylcarbonate end groups on the organopolysiloxane-polycarbonate is disclosed, for example, in U.S. Pat. No. 3,419,634 of Howard Vaughn, Jr., issued on Dec. 31, 1968, based upon application Ser. No. 517,920, filed Jan. 3, 1966, and assigned to the same assignee as the present invention.

The organopolysiloxane materials substituted with mercaptoalkyl groups can include such monomers as bis-(gamma-mercaptopropyl)dimethylsilane, bis-(delta - mercaptobutyl)ethylmethylsilane, etc. As previously disclosed, the organosilicon material can also be an organopolysiloxane, including such materials as bis-(gamma-mercaptopropyl)tetramethyldisiloxane, and longer chain organopolysiloxanes including hydrocarbon and mercaptoalkyl substituents at any point along the chain, so long as the organopolysiloxane has at least two, and preferably more, mercaptoalkyl substituents. Preferably, no silicon atom in the chain contains more than one mercaptoalkyl substituent.

The mercaptoalkyl-substituted organopolysiloxanes employed according to the present invention preferably have at least 5, and more preferably at least 10, silicon atoms in the chain, and the number of siloxy units in the chain can vary up to 50, 100, or more. The chain length is, most preferably, less than 100 siloxy units. Among representative organopolysiloxanes having mercaptoalkyl substituents are the following:

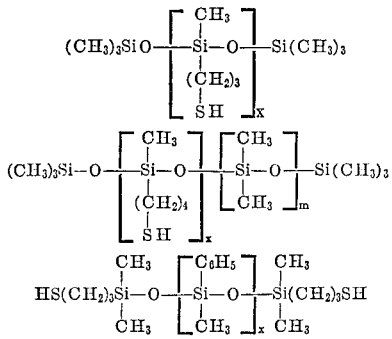

where $x$ is at least 2, and the sum of $x$ and $m$ is preferably from 5 to 100. In the second formula listed, the placement of the delta-mercaptobutylmethylsiloxy units and the dimethylsiloxy units in the formula is not indicative of the location of these units within the actual polymer chain.

These materials can be formed, for example, by the processes shown in the previously issued patent of R. V. Viventi, U.S. Pat. No. 3,346,405.

The amount of compound of Formula 1 which should be employed, relative to the organopolysiloxane-polycarbonate copolymer, varies over wide limits. The amount is, primarily, dependent upon the amount of mercaptoalkyl-substituted silicon contained within the compound. Thus, for each 100 parts of organopolysiloxane-polycarbonate copolymer, there should be from about 2 to 15 parts, by weight, of the mercaptoalkyl substituted organosilicon compound of Formula 1, where each silicon atom in the compound has one mercaptoalkyl substituent. Where fewer than all of the silicon atoms in the compound have a mercaptoalkyl substituent, the amount of compound of Formula 1 which is employed should be correspondingly increased. Preferably, the amount which is employed ranges from about 4 to 10 parts.

The cross linking of the organopolysiloxane-polycarbonate copolymer having allylcarbonate groups is carried out, with the mercaptoalkyl substituted compound of Formula 1 and radiation, at temperatures approximating room temperature. In general, this cross-linking reaction can be carried out at temperatures ranging from approximately 0° C. up to about 50° C. The time required for the cross-linking is, of course, dependent upon the temperature at which the cross-linking is carried out.

In order to assure an intimate mixture between the organopolysiloxane-polycarbonate copolymer and the organosilicon material with the mercaptoalkyl substituents, it is preferable to mix the materials in a solvent and allow the solvent to evaporate during the cross-linking reaction. Suitable solvents include chlorinated materials, such as methylene chloride, and ketones, such as methylethylketone. The total of reactant materials should generally be in the range of from 10% to 90%, based upon the total weight of solution. Solvents of the type mentioned above can, of course, be combined in any desired ratio.

The materials and process of the present invention will now be described in greater detail in the following examples. These examples should be considered as illustrative only and not as limiting in any way the full scope of the invention as covered in the appended claims. All parts in the following examples are by weight.

EXAMPLE 1

A quantity of 10 parts of allylcarbonate chain-stopped silicon organopolysiloxane-polycarbonate copolymer as described in Example 3A of the aforementioned U.S. Pat. No. 3,419,634 was mixed with one part of gamma-mercaptopropylmethylpolysiloxane of formula:

(3) 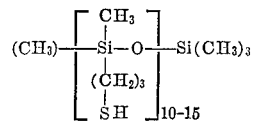

The mixture was dissolved in a solvent mixture consisting of 50 parts of methylene chloride and 50 parts of methylethylketone. The solvent was allowed to evaporate until the solids concentration was approximately 50%.

In order to illustrate the synergistic effect of the radiation and the gamma-mercaptopropyl-substituted fluid, the solution was divided into 2 parts. Part A was allowed to lose its solvent to the open atmosphere, but was protected from radiation. Part B was similarly allowed to lose its solvent to the atmosphere, but was exposed to the radiation from a sun lamp at a temperature under 35° C. A third sample, part C, was prepared comprising the same organopolysiloxane-polycarbonate copolymer as used for parts A and B, contained in a similar amount of solvent, but without the material of Formula 3. This third sample was also allowed to lose its solvent to the atmosphere, while exposed to radiation from the same sun lamp at a temperature below 35° C.

Each of the three samples was examined after 36 hours. Part A, which was allowed to lose its solvent to the atmosphere, but was shielded from radiation, was found to be tack-free, but weak and soluble in methylene chloride and, thus, apparently unchanged by the addition of the mercaptopropyl-substituted organopolysiloxane fluid. Part C, which was subject to radiation, but did not receive the mercaptopropyl-substituted organopolysiloxane fluid, was clear, also tack-free, but was also weak and soluble in methylene chloride, also apparently unchanged.

The second sample, part B, which contained the mercaptopropyl-substituted organopolysiloxane fluid of Formula 3 and was, additionally, subjected to radiation during evaporation of the solvent was tack-free, tough, and insoluble in methylene chloride.

EXAMPLE 2

A composition similar to that of Example 1 was prepared employing 10 parts of the same allylcarbonate terminated organopolysiloxane - polycarbonate copolymer, but using two parts of a dimethylpolysiloxane-gamma mercaptopropylmethylpolysiloxane fluid of formula:

(4) 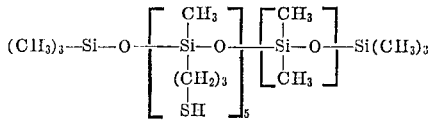

This mixture was dissolved in 10 parts of methylene chloride and was allowed to lose its solvent to the atmosphere while exposed to radiation. After 36 hours, the material was tested, and was found to be tack-free, tough, and insoluble in methylene chloride.

Thus, a new composition of matter, useful in the room temperature vulcanization of allylcarbonate terminated organopolysiloxane-polycarbonate copolymers has been shown, as well as a method of curing these copolymers at room temperature.

What I claim as new and desire to secure by letters Patent of the United States is:

1. A method for curing organopolysiloxane - polycarbonate copolymers having allyl carbonate groups comprising mixing with 100 parts, by weight, of an organopolysiloxane-polycarbonate copolymer having the following formula:

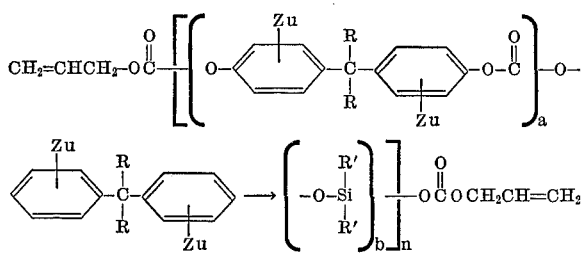

where $n$ is at least 1, $a$ is equal to from 1 to about 200, $b$ is equal to from about 5 to about 200, inclusive, the ratio of $a$ to $b$ is from about 0.05 to about 3, inclusive, $u$ is an integer equal to from 1 to 4, R is a member selected from the class consisting of hydrogen, monovalent hydrocarbon radicals and halogenated monovalent hydrocarbon radicals having less than 18 carbon atoms, R' is a member selected from the class consisting of monovalent hydrocarbon radicals, halogenated monovalent hydrocarbon radicals and cyanoalkyl radicals of less than 18 carbon atoms, Z is a member selected from the class of hydrogen, lower alkyl radicals and halogen radicals, with 2 to 15 parts, by weight, of an organosilicon material of the formula:

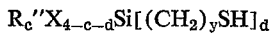

where R" is a hydorcarbon radical of less than 18 carbon atoms, X is selected from the class consisting of hydrocarbon radicals of less than 18 carbon atoms and $O_{0.5}$; $c$ is from 1 to 2, $d$ is 0.02 to 2, and $y$ is from 3 to 25; the organosilicon material having at least two groups of formula —$(CH_2)_2SH$; dissolving the mixture in a solvent, and causing the solvent to evaporate while the mixture is exposed to radiation in the range of 100 to 20,000 angstroms.

2. A room temperature curing composition comprising an organopolysiloxane-polycarbonate copolymer having allyl carbonate groups and of the formula:

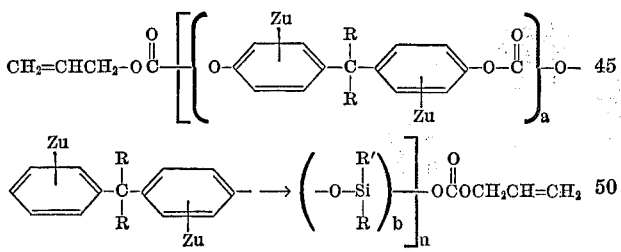

is equal to from about 5 to 200, inclusive, the ratio of $a$ to $b$ is from about 0.05 to about 3, inclusive, $u$ is an interger equal to from 1 to 4, R is a member selected from the class consisting of hydrogen, monovalent hydrocarbon radicals and halogenated monovalent hydrocarbon radicals of less than 18 carbon atoms, R' is a member selected from the class consisting of monovalent hydrocarbon radicals, halogenated monovalent hydrocarbon radicals, and cyanoalkyl radicals of less than 18 carbon atoms, Z is a member selected from the class of hydrogen, lower alkyl radicals and halogen radicals, which is cured at approximately room temperature with 2 to 15 parts, by weight, of an organosilicon compound of the formula,

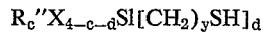

where R" is a hydrocarbon group having less than 18 carbon atoms, X is selected from the class consisting of hydrocarbon groups having less than 18 carbon atoms and $O_{0.5}$. $c$ is from 1 to 2, $d$ is from 0.02 to 2, and $y$ is from 3 to 25, said organosilicon compound having at least two groups of formula —$(CH_2)_ySH$, for each 100 parts by weight of the organopolysiloxane-polycarbonate copolymer, in the presence of radiation in the range of from 100 to 20,000 angstrom units.

3. The method of claim 1 wherein the organosilicon material has the formula:

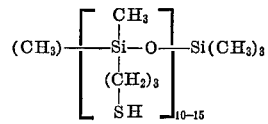

4. The cured copolymer of claim 2 wherein the organosilicon compound has the formula:

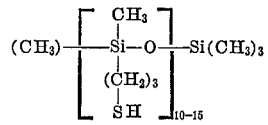

References Cited
UNITED STATES PATENTS

| | | | |
|---|---|---|---|
| 3,382,196 | 5/1968 | Gowdy et al. | 260—827 |
| 3,419,634 | 12/1968 | Vaughn | 260—46.5 |
| 3,440,302 | 4/1969 | Speier et al. | 260—827 |
| 3,453,248 | 7/1969 | Gowdy et al. | 204—159.13 |

SAMUEL H. BLECH, Primary Examiner

U.S. Cl. X.R.

260—32.8, 33.8, 46.5, 448.2, 824